(12) United States Patent
Barrett et al.

(10) Patent No.: US 12,111,245 B1
(45) Date of Patent: Oct. 8, 2024

(54) CALIBRATING CLOSE INTERVAL SURVEY DATA WITH REMOTE MONITORING DATA

(71) Applicant: Mobiltex Data Ltd., Calgary (CA)

(72) Inventors: Matthew Albert Barrett, Calgary (CA); Antonio Laranjo Da Costa, Calgary (CA); William Philip Maize, Calgary (CA)

(73) Assignee: Mobiltex Data Ltd., Alberta (CA)

( * ) Notice: Subject to any disclaimer, the term of this patent is extended or adjusted under 35 U.S.C. 154(b) by 0 days.

(21) Appl. No.: 18/122,217

(22) Filed: Mar. 16, 2023

(51) Int. Cl.
*G01N 17/02* (2006.01)

(52) U.S. Cl.
CPC .................................. *G01N 17/02* (2013.01)

(58) Field of Classification Search
CPC ....................................................... G01N 17/02
USPC ........................................................... 702/85
See application file for complete search history.

(56) References Cited

U.S. PATENT DOCUMENTS

| 8,612,189 B2 * | 12/2013 | Golinveaux | ............ | G05B 17/02 |
| | | | | 703/6 |
| 2003/0074162 A1 * | 4/2003 | Fourie | ................ | G01R 31/3275 |
| | | | | 702/188 |
| 2023/0014791 A1 * | 1/2023 | Tinnea | .................... | C23F 13/04 |

OTHER PUBLICATIONS

W. B. Holtsbaum, Cathodic Protection Survey Procedures. NACE International, 2009.
Standard Test Method Measurement Techniques Related to Criteria for Cathodic Protection on Underground or Submerged Metallic Piping Systems, TM0497-200th ed., No. 21231. Houston, Texas: NACE, 2002.
"Control of External Corrosion on Underground or Submerged Metallic Piping Systems," NACE Stand., vol. SP0169-201, No. 21001, 2013.
K. Parker and T. Johnston, "An Engineered , Integrated Approach to External Corrosion Management," No. April, pp. 1-7, 2022.
T. da Costa and M. Barrett, "Improving Cathodic Protection Monitoring Data in the Time of Ilot and Big Data," in Corrosion, 2021, No. 16259, pp. 1-13.
F. King, R. Given, R. G. Worthingham, and G. Van Boven, "Effect of transitions in the water table and soil moisture content on the cathodic protection of buried pipelines," J. Press. Vessel Technol. Trans. ASME, vol. 133, No. 1, pp. 1-11, 2011, doi: 10.1115/1.4002255.

(Continued)

*Primary Examiner* — Ricky Go
(74) *Attorney, Agent, or Firm* — Hartman Global IP Law; Gary M. Hartman; Domenica N. S. Hartman

(57) ABSTRACT

A method for calibrating close interval survey (CIS) data with remotely monitored data includes obtaining a plurality of CIS measurements from a plurality of CIS locations along a pipeline, obtaining a first plurality of remotely monitored measurements from a plurality of test stations positioned along the pipeline for a first time period, assigning, for each of the plurality of test stations, one of the plurality of CIS locations as an adjacent CIS location based on location data for the plurality of CIS locations and the plurality of test stations, and, calibrating the CIS data with the remotely monitored data by using the first plurality of remotely monitored measurements for each of the plurality of test stations as a proxy measurement for the adjacent CIS location.

19 Claims, 13 Drawing Sheets

(56) References Cited

OTHER PUBLICATIONS

F. King, G. Van Boven, K. Lawson, N. Thompson, P. Nichols, and R. Reid, "Cathodic protection of pipelines in high resistivity soils and the effect of seasonal changes," in NACE—International Corrosion Conference Series, 2006, No. 06163, pp. 061631-0616315.
A. W. Peabody, Control of Pipeline Corrosion.
S. McKelvey, "Applying the Big Data Approach to CP: Opportunities and Pitfalls," in NACE Northern Area Western Conference, 2019, No. 2, pp. 1-8.
D. Gautier, "Data Quality Management: Mitigating Data Corrosion in the Age of Big Data Analytics," Materials Performance, 2019.

* cited by examiner

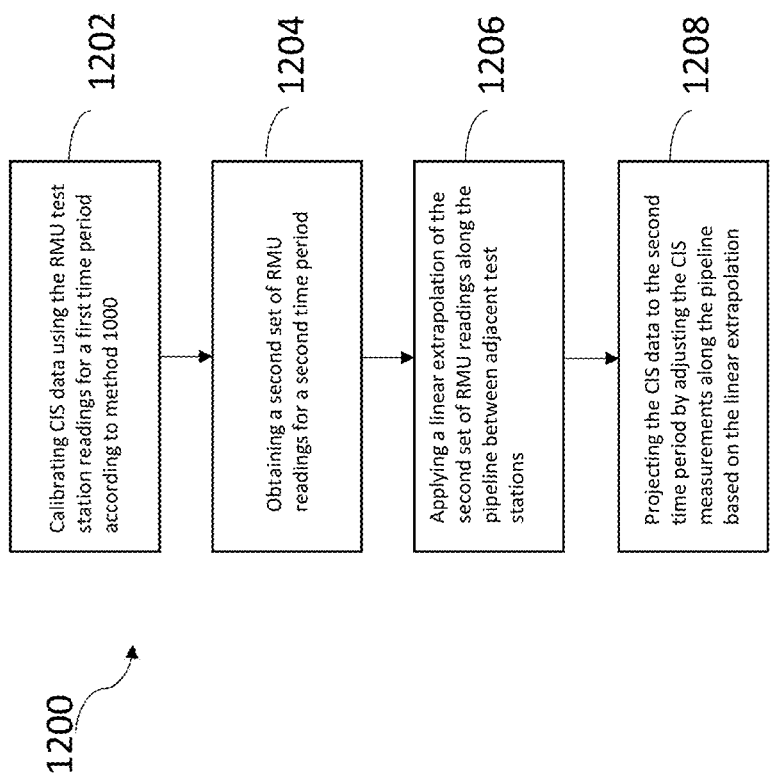

CALIBRATING CLOSE INTERVAL SURVEY DATA WITH REMOTE MONITORING DATA

TECHNICAL FIELD

The present disclosure relates to calibrating close interval survey data with remote monitoring data obtained from cathodic protection systems. More particularly, the present disclosure relates to calibrating the close interval survey data based on seasonal variations modelled by the remote monitoring data.

BACKGROUND

Metallic structures such as pipelines, tunnels, conduits, power towers, and tanks embedded in electrolytic media such as soil are subject to corrosive electrochemical forces. Corrosion in metallic structures can result in damage which can potentially be dangerous and costly to repair. Corroded metallic structures such as pipelines can be subject to failure or contamination which can result in the release of potentially hazardous materials into the natural environment.

One method for protecting against metallic structure corrosion includes use of cathodic protection (CP) systems which prevent corrosion by making the metallic structure the cathode of an electrochemical cell. One type of CP system used for preventing corrosion in a pipeline is a passive CP system in which the pipeline is connected to a metal object which is more easily corroded to act as the "sacrificial anode" of the electrochemical cell. Another type of CP system is an impressed current CP system in which an external power source such as a rectifier is physically connected to the pipeline and an anode, and protects a section of the pipeline from corrosive activity by distributing protective current to the pipeline and driving corrosion to the anode. Multiple rectifiers can be positioned along the length of the pipeline to protect long sections of the pipeline, and preferably the entire pipeline, from corrosive activity.

To provide consistent protection, the electrochemical exchange between the pipeline structure and the cathodic protection system must be maintained in balance. Accordingly, the level of cathodic protection must be periodically tested to monitor performance of the cathodic protection system.

Methods for assessing the performance of the cathodic protection system include obtaining measurements of potential between the cathodically protected pipeline metal structure and a reference electrode. This allows for measurement of the "pipe-to-soil" potential, which is the potential difference generated between the pipeline and its surrounding soil. Pipe-to-soil potential is typically measured at every test station along the pipeline on an annual basis in accordance with established regulations. The test stations provide an above-ground access point to connect cables from a buried structure such as a pipeline, and are an integral part of any pipeline cathodic protection system. Each test station is electrically connected to the pipeline by a test cable and the potential of the pipeline may be measured from the test station. A reference electrode may be placed in the soil in the vicinity of the protected pipeline. A reference electrode, or "half-cell" is a stable electrode having known potential. The purpose of a reference electrode is to allow for determination of the potential of the other electrode or "half" of the electrochemical cell. One common type of reference electrode is the copper/copper sulfate (CSE) electrode. A voltmeter is connected between the test station and the reference electrode, with its negative terminal connected to the terminal of the reference electrode and the positive terminal connected to the test station. Thereby, a galvanic cell is created by connecting the two "half-cells" together, the first half being the natural half-cell formed between the pipeline and the soil and the second half-cell being the reference electrode. Accordingly, the voltage between the buried pipeline and the surrounding soil, or pipe-to-soil potential, may be measured.

However, when measuring pipe-to-soil potential while the cathodic protection system is operating, a voltage drop through the soil due to the CP current, referred to as IR drop, can cause an error in the potential measurement. Accordingly, it is beneficial to electrically isolate the cathode or pipeline just prior to measuring the pipe-to-soil potential.

In order to obtain pipe-to-soil potential measurements that are free of IR drop, it is common to measure the potential immediately following interruption of the cathodic protection current. The instantaneous voltage drop which occurs immediately after the cathodic protection is turned off is equal to the IR drop caused by the interrupted cathodic protection current. Therefore, the potential measured immediately following interruption of the cathodic protection current, when current is zero, is the potential of the protected structure free of IR drop.

However, stray currents in the soil from other current sources including nearby electric trains, other cathodic protection systems, power lines, welding or telluric currents may not be interruptible. Another method of electrically isolating the pipeline at the time of pipe-to-soil potential measurement is by using a cathodic protection coupon. The coupon simulates an uncoated portion of the pipeline also known as a "holiday". The coupon is buried in the soil adjacent to the pipeline structure and is connected to the pipeline through a coupon test station. Therefore, the coupon sees the same cathodic protection current source as the pipeline. The use of CP coupons for measuring pipe-to-soil potential is beneficial as the IR-free protected potential of the pipeline structure can be inferred from the coupon, and adequate cathodic protection can be confirmed without the need to interrupt all sources of current in the vicinity of the pipeline.

In recent decades, advances in cellular and satellite communications have enabled remote monitoring of the electrical parameters associated with the cathodic protection system. This has enabled more frequent collection of data and a reduced time commitment for collection of data from sites which are difficult for an operator to reach. Such remote monitoring may be conducted by collecting data from remote monitoring units (RMU) physically coupled or in electronic communication with one or more of the rectifiers, pipe-to-soil test stations, or coupon test stations positioned along the pipeline.

Another method for monitoring cathodic protection systems associated with underground pipelines is performing pipe-to-soil close interval surveys (CIS) or close interval potential surveys (CIPS). A close interval survey involves walking the entire length of the pipeline, taking above-ground measurements of pipe-to-soil potential (voltage) every few meters. Close interval potential surveys are performed in order to obtain a continuous potential profile along the pipeline. Close interval surveys can also be carried out for only a selected section of the pipeline. Additionally, the spatial resolution of a close interval survey can be varied as measurements can be performed at different intervals along the pipeline.

A close interval survey provides the most granular picture of cathodic protection system, giving better visibility and information on locations along the pipeline that are more susceptible to corrosion, especially between RMU test stations, which are typically spaced a considerable distance apart and maybe insufficient to determine if the pipeline is protected along its entire length. Close interval surveys are conducted as an integral part of maintaining the safe operation of the pipeline. CIS are typically only conducted once every 5 to 10 years. Compounding this, a CIS will be conducted over a period of days or weeks, such that the data captured will reflect the seasonal conditions of that specific period, which may or may not be representative of the rest of the year.

Annual surveys can also be used to evaluate the effectiveness of cathodic protection systems. An annual potential survey is conducted by taking manual (i.e., not remote) measurements of pipe-to-soil potentials at above ground test stations along the pipeline while interrupting the current source. The potential measurements recorded in an annual survey are indicative of the level of cathodic protection at the test station location. The annual potential survey records pipe-to-soil potentials using a calibrated portable reference electrode or half-cell, unlike RMUs that use reference electrodes that are buried underground with the pipeline. Cathodic protection systems can also be monitored using in-line inspections that determine the possibility of corrosion, erosion, cracks in metal walls inside pipelines, and other types of damage in pipeline structures.

The different methods of assessing cathodic protection systems like close interval surveys, annual surveys, in-line inspections, and remote monitoring techniques allow for collection and storage of a large amount of data points each year. While the quality and quantity of data has improved over the years, most data collected remains unutilized or underutilized. Often the data obtained from the different techniques are considered separately. The cathodic protection industry is starting to explore how data from these different methods can be combined to unlock new insights which have not been readily available in the past.

There is a need to better analyze and combine the large amounts of data collected by the cathodic protection industry using data analytic techniques to further optimize the performance of cathodic protection systems and pipelines.

SUMMARY

The present disclosure relates to calibrating close interval survey data with remote monitoring data obtained from cathodic protection systems. More particularly, the present disclosure relates to calibrating the close interval survey data based on seasonal variations modelled by the remote monitoring data.

In general, data obtained from CIS is detailed with a higher resolution in a spatial sense while data obtained from remote monitoring has a higher relative resolution in a temporal sense. Data analytics techniques are used to combine the high spatial resolution measurements from a close interval survey with year-round, once daily or hourly measurements obtained from remote monitoring units of a cathodic protection system. The historic trends from remote monitoring unit readings (for e.g., pipe-to-soil, coupon readings or rectifier groundbed system resistance) are compared with close interval survey measurements to confirm the validity of the close interval survey readings at the test station locations and to calibrate the close interval survey readings based on seasonal variations modelled by the historic remotely monitored data.

The method according to the present application may be used to optimize the performance of cathodic protection systems and to improve pipeline integrity by helping to create a digital twin of a pipeline cathodic protection system. Using a digital twin in cathodic protection systems can inform how and when pipeline operators elect to perform survey work, be used to identify high-risk locations on the pipeline, provide insight into the influence of cathodic protection current sources at various locations on the pipeline, inform the selection of critical testing locations for future remote monitoring, and be incorporated as a key data point of an automated cathodic protection system that optimizes current sources in order to achieve adequate protection on the pipeline based on a plurality of sensors and data sources.

In one aspect, there is provided a method for calibrating close interval survey (CIS) data with remotely monitored data. The method includes obtaining a plurality of CIS measurements from a plurality of CIS locations along a pipeline. Preferably, the plurality of CIS measurements are obtained during the first time period. The plurality of CIS measurements may include pipe-to-soil alternating current (AC) and direct current (DC) potentials at each of the plurality of CIS locations. The method further includes obtaining a first plurality of remotely monitored measurements from a plurality of test stations positioned along the pipeline for a first time period, assigning, for each of the plurality of test stations, one of the plurality of CIS locations as an adjacent CIS location based on location data for the plurality of CIS locations and the plurality of test stations, and, calibrating the CIS data with the remotely monitored data by using the first plurality of remotely monitored measurements for each of the plurality of test stations as a proxy measurement for the adjacent CIS location. In one aspect, the remotely monitored data may include time-series voltage data or time-series current data. In another aspect, the first plurality of remotely monitored measurements may include historic daily DC potential measurements from each of the plurality of test stations.

In a further aspect, the method may include obtaining a second plurality of remotely monitored measurements from the plurality of test stations for a second time period, applying an extrapolation of the second plurality of remotely monitored measurements along the pipeline between two adjacent test stations of the plurality of test stations, and, projecting the plurality of CIS measurements to the second time period by adjusting the plurality of CIS measurements based on the extrapolation of the second plurality of remotely monitored measurements along the pipeline.

The method may further include calculating, for each of the plurality of test stations, an average value of the first plurality of remotely monitored measurements, and, calibrating the CIS data with the remotely monitored data by using the average value of the first plurality of remotely monitored measurements for each of the plurality of test stations as the proxy measurement for the adjacent CIS location. In one aspect, the plurality of test stations includes a first test station positioned at a first end of the pipeline and a second test station positioned at a second end of the pipeline. Preferably, the plurality of CIS measurements and the first plurality of remotely monitored measurements are recorded with latitude and longitude data and global positioning system (GPS) timestamps.

In another aspect, the assigning, for each of the plurality of test stations, one of the plurality of CIS locations as the adjacent CIS location based on location data for the plurality of CIS locations and the plurality of test stations may further include calculating a distance between latitude and longitude of each of the plurality of test stations and each of the plurality of CIS locations.

In another aspect, the method may include applying a seasonal variation model to the first plurality of remotely monitored measurements to obtain seasonally adjusted remotely monitored measurements for each of the plurality of test stations for a second time period, applying an extrapolation of the seasonally adjusted remotely monitored measurements along the pipeline between two adjacent test stations of the plurality of test stations, and projecting the plurality of CIS measurements to the second time period by adjusting the plurality of CIS measurements based on the extrapolation of the seasonally adjusted remotely monitored measurements along the pipeline. Applying the seasonal variation model may include using a cosine function represented by:

$$V_{DC}=A\cos(2\pi t-\varphi)+mt+V_o$$

wherein $V_{DC}$ is the DC potential, A is amplitude, t is absolute time, $\varphi$ is phase-shift, representing the calendar date of maximum potential, m is the slope change in potential over time, and $V_o$ is the average potential.

In yet another aspect, the method may further include obtaining remotely monitored rectifier voltage and current measurements from a plurality of rectifiers installed along the pipeline, and, analyzing the influence of the rectifier voltage and current measurements on the CIS data.

In another aspect, there is provided a computer-implemented method for seasonally modelling close interval survey (CIS) data for a pipeline segment. The method includes validating CIS potential measurements taken along the pipeline segment during a first time period with remotely monitored potential measurements measured at a plurality of test stations along the pipeline segment during the first time period based on location data of the CIS potential measurements and the remotely monitored potential measurements, applying a seasonal variation model to the remotely monitored potential measurements to obtain seasonally adjusted potential measurements for the plurality of test stations for a second time period, applying an extrapolation of the seasonally adjusted potential measurements along the pipeline between two adjacent test stations of the plurality of test stations, and, projecting the CIS data to the second time period by adjusting the CIS potential measurements based on the extrapolation of the seasonally adjusted potential measurements along the pipeline.

The seasonal variation model may include using a cosine function represented by:

$$V_{DC}=A\cos(2\pi t-\varphi)+mt+V_o$$

wherein $V_{DC}$ is the DC potential, A is amplitude, $\varphi$ is phase-shift, representing the calendar date of maximum potential, m is the slope change in potential over time, and $V_o$ is the average potential.

Validating the CIS potential measurements with the remotely monitored potential measurements may include assigning, for each of the plurality of test stations, a location of one of the CIS potential measurements as an adjacent CIS location based on the location data for the CIS potential measurements and the plurality of test stations, and, calibrating the CIS potential measurements with the remotely monitored potential measurements by using the remotely monitored potential measurements for each of the plurality of test stations as a proxy measurement for the adjacent CIS location.

In another aspect, there is provided a computer-implemented method for seasonally modelling close interval survey (CIS) data. The method includes validating CIS potential measurements taken along a pipeline segment during a first time period with a first plurality of remotely monitored potential measurements measured at a plurality of test stations along the pipeline segment during the first time period, obtaining a second plurality of remotely monitored potential measurements measured at the plurality of test stations during a second time period, applying an extrapolation of the second plurality of remotely monitored potential measurements between two adjacent test stations of the plurality of test stations for the second time period, and, projecting the CIS data to the second time period by adjusting the CIS potential measurements from the first time period based on the extrapolation of the second plurality of remotely monitored potential measurements.

Validating CIS potential measurements with a first plurality of remotely monitored potential measurements may include calibrating the CIS potential measurements with an average of the first plurality of remotely monitored potential measurements at each of the plurality of test stations based on location data of the CIS potential measurements and the plurality of test stations.

In another aspect, there is provided a computer program product including a computer readable memory storing computer executable instructions thereon that when executed by a computer perform a method including receiving close interval survey data from a close interval survey (CIS) performed at a plurality of CIS locations along a pipeline, receiving remotely monitored data from a plurality of test stations positioned along the pipeline, assigning, for each of the plurality of test stations, one of the plurality of CIS locations as an adjacent CIS location based on location data for the plurality of CIS locations and the plurality of test stations, and, calibrating the close interval survey data with the remotely monitored data by using the remotely monitored data for each of the plurality of test stations as a proxy measurement for the adjacent CIS location.

In another aspect, there is provided a system including at least one computer, and, at least one non-transitory computer-readable media storing computer-readable instructions that, when executed by the at least one computer, cause the at least one computer to perform a method for calibrating close interval survey (CIS) data with remotely monitored data. The method includes obtaining a plurality of CIS measurements from a plurality of CIS locations along a pipeline. Preferably, the plurality of CIS measurements are obtained during the first time period. The plurality of CIS measurements may include pipe-to-soil AC and DC potentials at each of the plurality of CIS locations. The method further includes obtaining a first plurality of remotely monitored measurements from a plurality of test stations positioned along the pipeline for a first time period, assigning, for each of the plurality of test stations, one of the plurality of CIS locations as an adjacent CIS location based on location data for the plurality of CIS locations and the plurality of test stations, and, calibrating the CIS data with the remotely monitored data by using the first plurality of remotely monitored measurements for each of the plurality of test stations as a proxy measurement for the adjacent CIS location.

These general and specific techniques may be implemented using a system, a method, a non-transitory computer readable media, a computer program, or any combination of systems, methods, media, and programs. For example, the techniques can be implemented using one or more non-transitory computer-readable media storing instructions that, when executed by at least one computer cause the at least one computer to perform the described actions.

BRIEF DESCRIPTION OF THE DRAWINGS

Exemplary non-limiting embodiments are described with reference to the accompanying drawings in which.

DETAILED DESCRIPTION

Figure 1A:
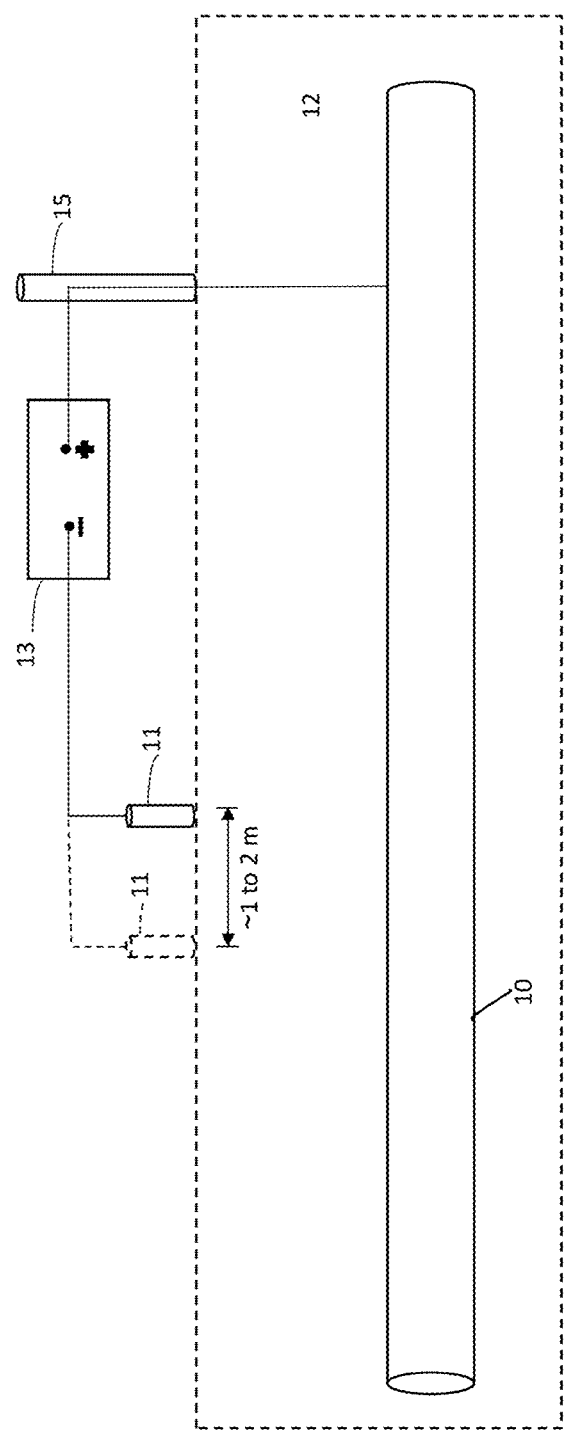
FIG. 1A is a diagram representing components of a CIS measurement apparatus for monitoring cathodic protection of a buried pipeline in accordance with an aspect of the present application.

The present disclosure relates to calibrating close interval survey data with remote monitoring data obtained from cathodic protection systems. More particularly, the present disclosure relates to calibrating the close interval survey data based on seasonal variations modelled by the remote monitoring data.

Cathodic protection may be applied to a variety of suitable metallic structures including, by way of non-limiting example, marine structures, storage tanks, bridges, power line towers or other electrical grid infrastructure and pipelines for conveying fluids such as oil, water, or gas. The cathodic protection system is described herein within the context of a preferred aspect wherein the metallic structure is a pipeline, such as an oil pipeline embedded in electrolytic media such as soil. However, it should be understood that the present invention is not limited to this preferred aspect and may be applicable to other metallic structures in other electrolytic media environments.

A close interval survey (CIS) or a close interval potential survey (CIPS) is a commonly used method for monitoring a cathodic protection system for a pipeline. CIS involves pipeline maintenance personnel traveling to the pipeline and taking the measurements of pipe-to-soil potential as a function of distance along the pipeline of interest. CIS readings may be taken along the entire length of the pipeline. However, CIS readings are generally performed on a section of interest of the pipeline, with the sections typically dictated by regulation, risk, troubleshooting, and results from other integrity exercises (for e.g., In-line Inspection (ILI) runs). The typical spacings between reading locations in a CIS are in the meter length scale. The locations on the pipeline where CIS readings are taken are called CIS stations. CIS stations are typically numbered consecutively from one end of the pipeline to the other end.

CIS on a pipeline is typically performed once every few years due to the high cost and time commitment of the process. However, a benefit of CIS is that they provide high spatial resolution measurements. A CIS is the most granular picture of a pipelines cathodic protection profile and is very useful in understanding potential issues such as CP noncompliance, risk, and coating defects.

CIS measurements involve measuring the polarized potential of the pipeline. CIS helps identify locations along the length of a buried pipeline that are not registering a sufficient potential difference between pipe and soil, which would be indicative of locations that might be experiencing external corrosion. An industry standard of 0.85 Volts or 850 mV is applied in the cathodic protection industry to signify sufficient cathodic protection, which represents the minimum potential difference or voltage recorded between the pipe and the soil with respect to a copper/copper sulfate reference electrode. Since a pipeline under cathodic protection is held at a negative potential, i.e., the pipeline is connected to the negative side of a rectifier, the minimum IR-free potential difference between pipe and soil would be −0.85 Volts or −850 mV.

CIS pipe-to-soil potential measurements are influenced by the cathodic protection current, which introduces a measurement error known as IR drop. To eliminate this error, cathodic protection sources are synchronously interrupted momentarily, after which the potentials are measured, but before the pipe depolarizes. The potentials measured in this way are referred to as Instant Off potentials. Such interrupted measurements are typically collected over the length of the pipeline as part of a CIS. CIS data typically consists of voltage measurements, namely "DC On potential" with cathodic protection current on, and "DC Instant Off potential" with cathodic protection current interrupted instantaneously.

FIG. 1A is a diagram representing components of a CIS measurement apparatus for monitoring cathodic protection of a buried pipeline in accordance with an aspect of the present application. FIG. 1A illustrates a pipeline 10 buried in soil 12. A plurality of test stations 15 are positioned along the pipeline. Test station 15 provides an above-ground access point to the pipeline 10 and is in electrical contact with the pipeline 10 buried in soil 12. The CIS measurement apparatus includes a portable reference electrode 11 and a voltmeter or a data-logger 13 that can be connected to the test station 15. The portable reference electrode 11 is a stable electrode having known potential which allows for determination of the pipe-to-soil potential. One common type of reference electrode is the copper/copper sulfate (CSE) electrode. The negative terminal of the data-logger 13 is connected to the soil through the reference electrode 11 and the positive terminal of the data-logger is connected to test station 15 for recording CIS data along the pipeline. Thereby, a galvanic cell is created by connecting the two "half-cells" together, the first half being the natural half-cell formed between the pipeline 10 and the soil 12 and the second half-cell being the reference electrode 11. Accordingly, the voltage between the buried pipeline 10 and the surrounding soil 12, or pipe-to-soil potential, may be measured at the location of the portable reference electrode 11. The data-logger 13 measures and stores the potential difference between the pipeline 10 and the soil 12 at the location of the portable reference electrode 11. Pipe-to-soil potentials with respect to the portable reference electrode 11 can be recorded at measurement intervals of a few meters along the length of the pipeline.

Another routinely used method for monitoring cathodic protection systems is remote monitoring of cathodic protection systems on a pipeline using remote monitoring units (RMUs). A remote monitoring unit may be connected directly to the pipeline, or indirectly to a coupon. RMUs have largely been deployed to automate manual processes of recording specific readings on cathodic protection systems.

Figure 1B:
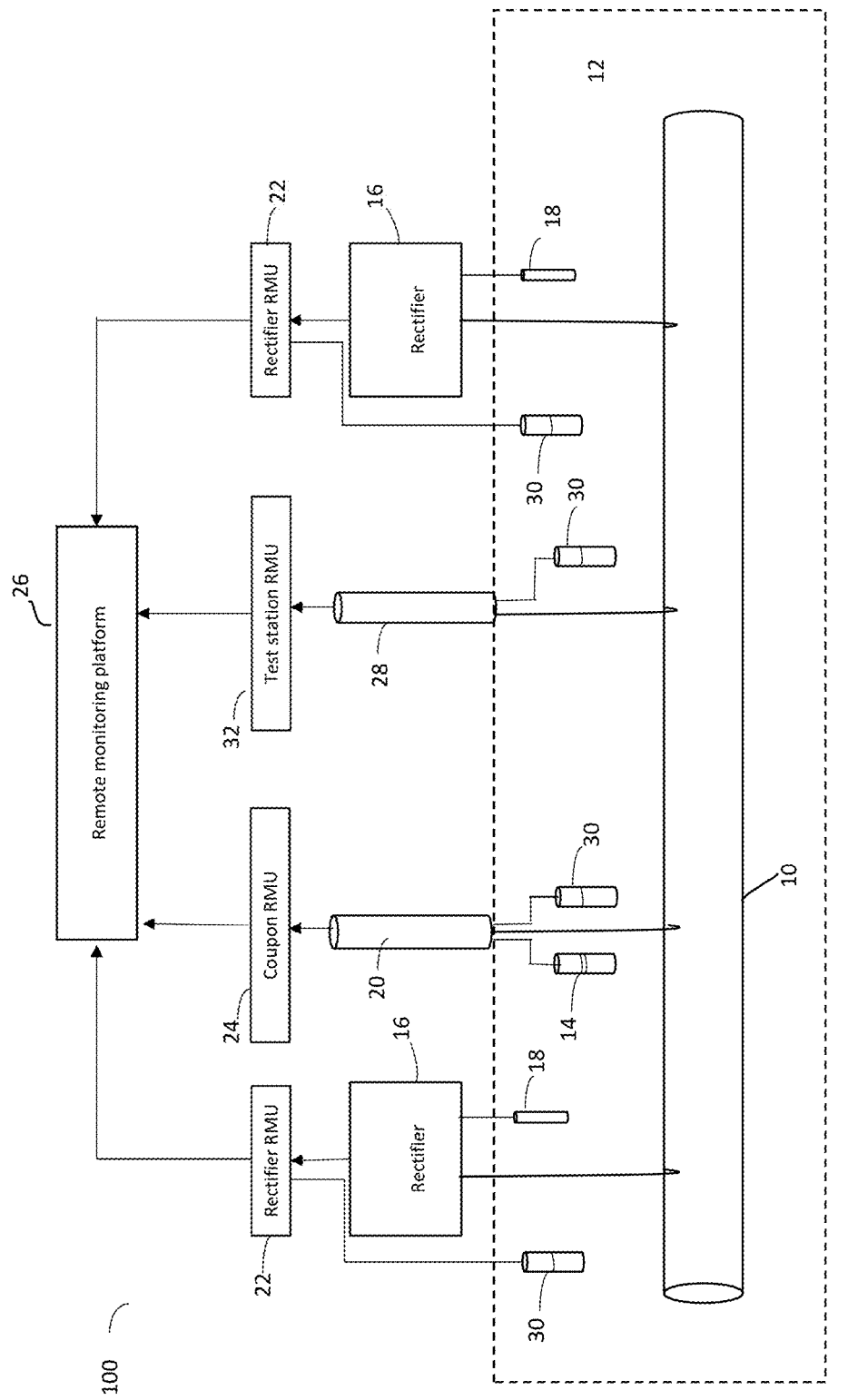
FIG. 1B is a diagram representing a cathodic protection monitoring system in accordance with an aspect of the present application.

FIG. 1B is a diagram representing a cathodic protection monitoring system using remote monitoring units in accordance with an aspect of the present application. FIG. 1B illustrates a cathodic protection monitoring system 100 for a pipeline 10. As shown in FIG. 1B, pipeline 10 is buried in soil 12. The buried pipeline 10 is connected to one or more rectifiers 16. The rectifier 16 is also connected to one or more anodes 18 which are also buried in the soil 12. The rectifier 16 drives a current into the pipeline 10 through the soil 12. Rectifier 16 is preferably an impressed current rectifier 16 and provides an electric current which counteracts the electrochemical process of corrosion. The rectifier 16 in electrical communication with pipeline 10 and anodes 18, provides cathodic protection to protect pipeline 10. Pipeline 10 may be continuous and extend over large distances. Accordingly, a plurality of rectifiers 16 may be spaced apart along pipeline 10 to provide cathodic protection along the length of pipeline 10, section by section thereof.

Rectifier remote monitoring unit 22 is coupled with rectifier 16 in data exchange communication therewith. Preferably, rectifier 16 and rectifier remote monitoring unit 22 are physically coupled in data exchange communication with one another via a suitable data exchange interface (not shown). Rectifier remote monitoring unit 22 receives and stores voltage and current readings from rectifier 16. Using Ohm's Law, resistance may be obtained by dividing voltage values by corresponding current values. The voltage, current and resistance readings may be captured as rectifier data by rectifier remote monitoring unit 22 on a constant basis or at a predetermined frequency such as hourly, daily, or weekly.

Monitoring system 100 also includes a plurality of pipe-to-soil test stations 28 positioned along the pipeline. Pipe-to-soil test station 28 is connected to the pipeline 10 and to a reference electrode 30 buried in the soil for measuring the potential of the pipeline with respect to the reference electrode 30. The pipe-to-soil test station 28 is in data exchange communication with a test station remote monitoring unit 32 for capturing pipe-to-soil potential observations. Typically, potential measurements will be captured on an hourly or daily basis and the potential measurements are sent to a remote monitoring platform 26 on a periodic interval schedule which is typically in a range of 7 to 28 days. However, it should be understood that collection of potential measurements is not limited only to that range. The interval schedule may be longer or shorter than 7 to 28 days.

As shown in FIG. 1B, monitoring system 100 may include a coupon 14 buried adjacent the pipeline 10. A coupon is typically an uncoated piece of the material used to make up the pipeline 10. Coupon 14 is used for measurement of the performance of the cathodic protection system. Coupon 14 is connected to a reference electrode 30 and a coupon test station 20 for measuring potentials and current flows of the coupon 14 at periodic measurement intervals. In one aspect, the coupon 14 and reference electrode 30 may be combined into a single unit (not shown). Coupon 14 is selectively in electrical connection with the pipeline 10 via a switch within the coupon test station 20 for interrupting the connection between the coupon 14 and the pipeline 10. Coupon remote monitoring unit 24 is coupled with coupon test station 20 in data exchange communication therewith. Preferably, coupon test station 20 and coupon remote monitoring unit 24 are physically coupled in data exchange communication with one another via a suitable data exchange interface (not shown). Coupon remote monitoring unit 24 captures DC On potentials, DC Instant-Off potentials, AC On potentials and current flows of the coupon from coupon test station 20 at the periodic measurement intervals. As further shown in the aspect illustrated in FIG. 1B, a reference electrode 30 may optionally be coupled in data exchange communication with rectifier remote monitoring unit 22. This would allow pipe-to-soil electrical measurements to be collected, for example.

Remote monitoring units 22, 24, 32 are in data communication with a remote monitoring platform 26 over a network (e.g., cellular, satellite) and upload rectifier and coupon test station data to the remote monitoring platform 26. Other communication forms and networks would also be possible, such as Wi-Fi™ internet etc. The monitoring platform 26 may be for example an external device, server, cloud server, or SaaS.

Close interval surveys (CIS) and remote monitoring units (RMUs) can be used as complimentary technologies for validating safe operation of a cathodic protection (CP) system. CIS on a pipeline is typically performed once every few years due to the high cost and time commitment of the process, but the benefit is a high spatial resolution of measurements, with typical spacings between reading locations on the meter length-scale. In contrast, RMU readings can be taken periodically on a weekly, daily or even hourly basis, throughout the year. RMUs are installed at test stations with a typical spacing of multiple kilometers between units, and can be used to measure comparable electrical readings year-round without requiring a human to physically travel to each location.

Combining CIS measurements with RMU readings can help validate safe operation of a cathodic protection system.

An RMU is capable of recording measurements that are comparable to that of a CIS measurement close to the test-station. Data analytics techniques may be used to combine the high spatial resolution measurements from a CIS with year-round, hourly or once daily remotely monitored measurements from nearby coupons.

The following describes how data analytics can be used for combining CIS measurements with RMU readings in accordance with an example embodiment of the present application. In the example embodiment, a 114 km segment of a 30.5 cm diameter coated steel pipeline running through subtropical desert is selected as the segment of interest for this analysis. This segment is part of an approximately 643 km pipeline which was commissioned and put into operation in 2012.

The segment of interest has been cathodically protected by three rectifiers which have been continuously monitored by remote monitoring units since 2012, with rectifier voltage and current output recorded at least once weekly. In addition, more than 30 coupons adjacent to the pipeline have been monitored since 2018 with AC and DC current density and potential readings taken once per hour. These readings make up the RMU data for the pipeline.

Accompanying the RMU data, a close interval survey (CIS) was performed on the pipeline in March 2021. This survey resulted in 25,000 measurements of pipe-to-soil AC and DC potentials along the segment of interest collected over a two-week period.

Figure 2:
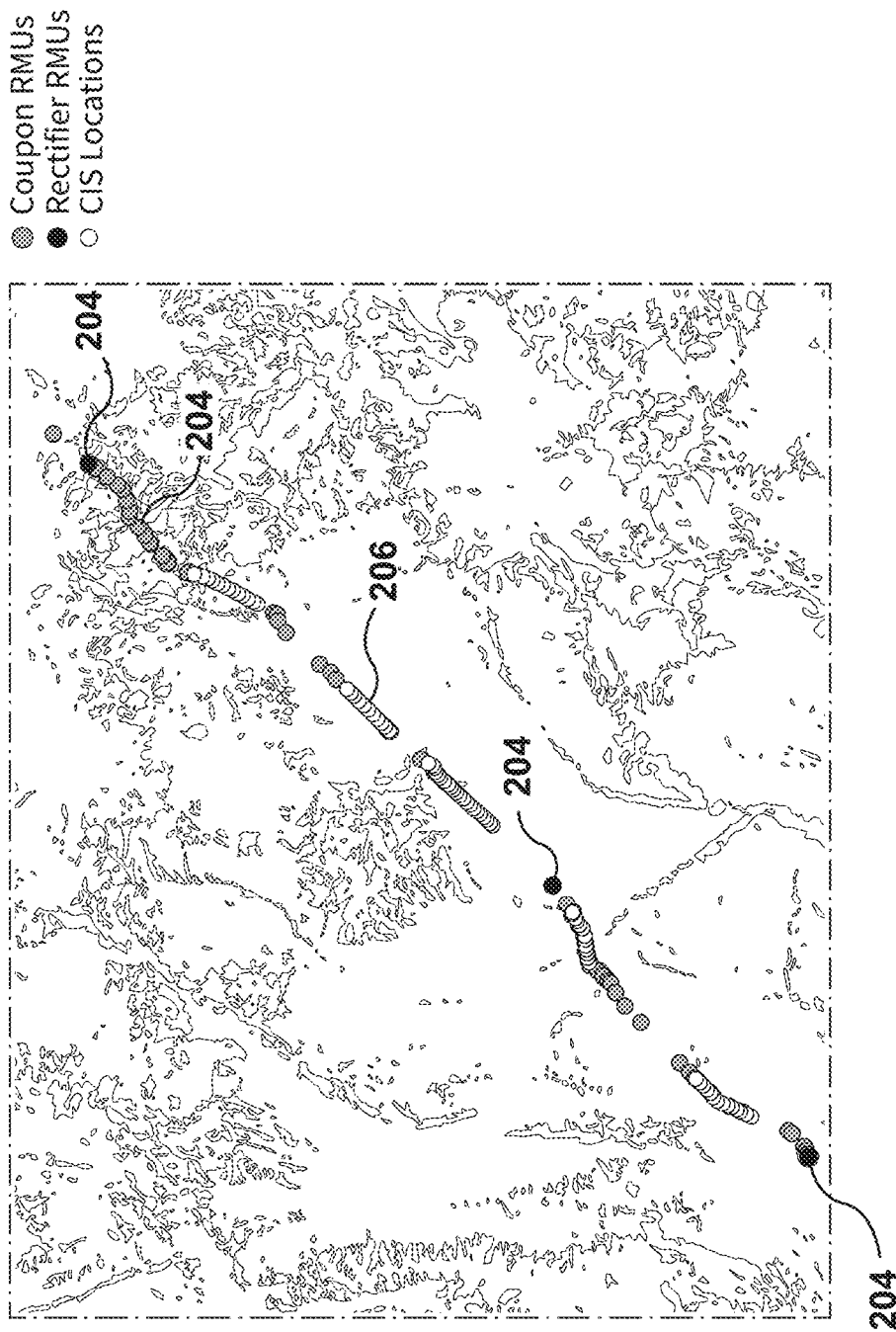
FIG. 2 is a satellite image of a pipeline's environment in accordance with an example embodiment of the present application.

FIG. 2 is a satellite image of the pipeline's environment in accordance with one aspect of the present application. The satellite image illustrates a mountainous desert terrain with some creek crossings. The locations of the RMU readings and CIS measurements are overlaid on the satellite image of the pipeline's environment shown in FIG. 2. The map shows the location of the three rectifier RMUs 204 along the pipeline. FIG. 2 further shows the locations of multiple coupon RMUs 202. In addition, multiple CIS measurement points 206 are shown along the pipeline segment of interest. The distance between the furthest CIS measurement points is approximately 114 km along the pipeline. All measurements have been recorded with accompanying latitude, longitude and GPS timestamps. This allows for comparisons between CIS readings and RMU readings to be made both spatially and temporally. In one aspect, the comparisons between CIS readings and RMU readings involve rectifier DC On and DC Instant Off potential measurements.

Figure 3:
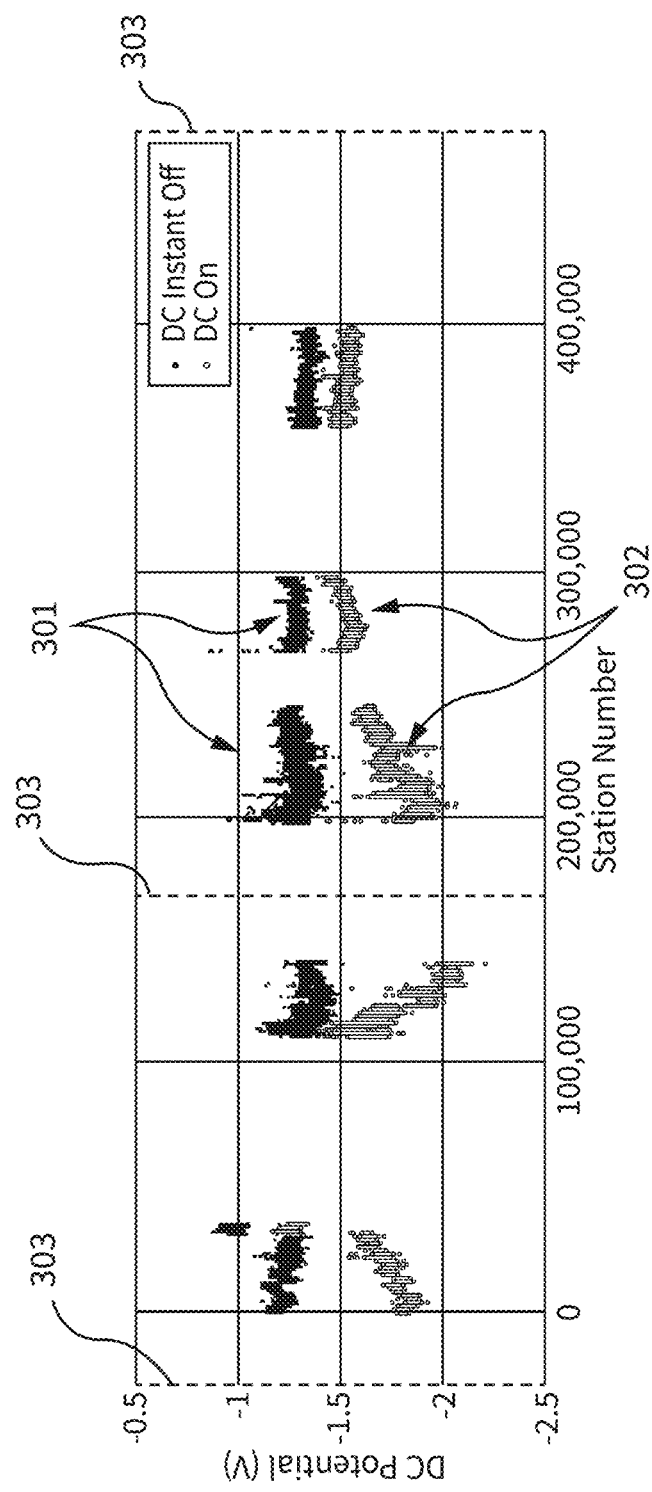
FIG. 3 is a graph showing CIS DC potential measurements along a pipeline in accordance with an example embodiment of the present application.

FIG. 3 is a graph showing CIS DC potential measurements along the pipeline as measured in March 2021 in accordance with an example embodiment of the present application. Over the 114 km segment of pipeline, roughly 400,000 station locations were measured. Stations are locations on the pipeline where CIS measurements are taken. The stations are numbered consecutively from one end of the pipeline segment to the other end. The DC Instant Off potential measurements 301 and DC On potential measurements 302 are plotted by station number in FIG. 3. The station numbers act as an indication of how far from the start of the survey each new point represents. Station zero is the start of the survey in the South-West. The dashed vertical lines 303 in FIG. 3 show the approximate location of the three rectifiers 204 along this pipeline segment. At the time of the survey, all measured stations were found to be in compliance with the regulatory criteria of −850 mV with cathodic protection applied.

As shown in FIG. 3, the DC On potentials 302 are closely influenced by voltage and current outputs of the three rectifiers 204. A clear trend is observed with the stations in closer proximity to the rectifiers showing a more negative DC On potential reading which is the manifestation of IR drop. This comparison of the CIS measurements with the historic trends from various RMU readings may be helpful in learning more about the influence of cathodic protection rectifiers at various distances along the pipeline.

Continuing with the example embodiment, further analysis is restricted to the continuous segment of the pipeline between station numbers 350,000 and 400,000. This section of the pipeline includes three coupon test stations located near either end of the pipeline segment. Two of the coupon test stations, located near station number 400,000, had very similar data. For simplicity, further analysis was limited to one of the coupon test stations near station number 400,000, hereinafter referred to as the East coupon test station, and the coupon station near station number 350,000, hereinafter referred to as the West coupon test station.

Figure 4A:
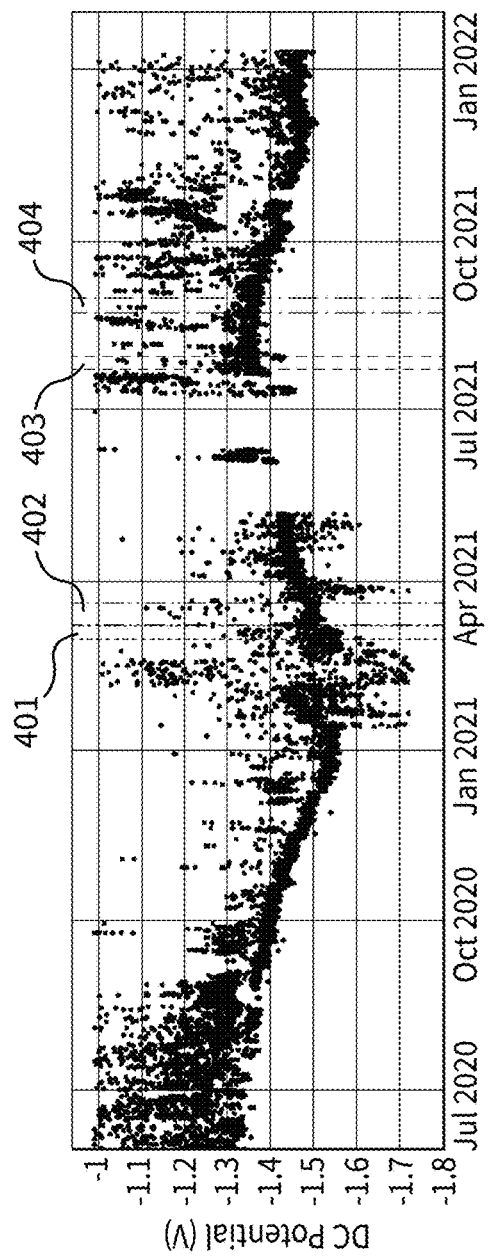
FIG. 4A is a graph showing remotely monitored coupon DC potential readings over time for a coupon in accordance with an example embodiment of the present application.
Figure 4B:
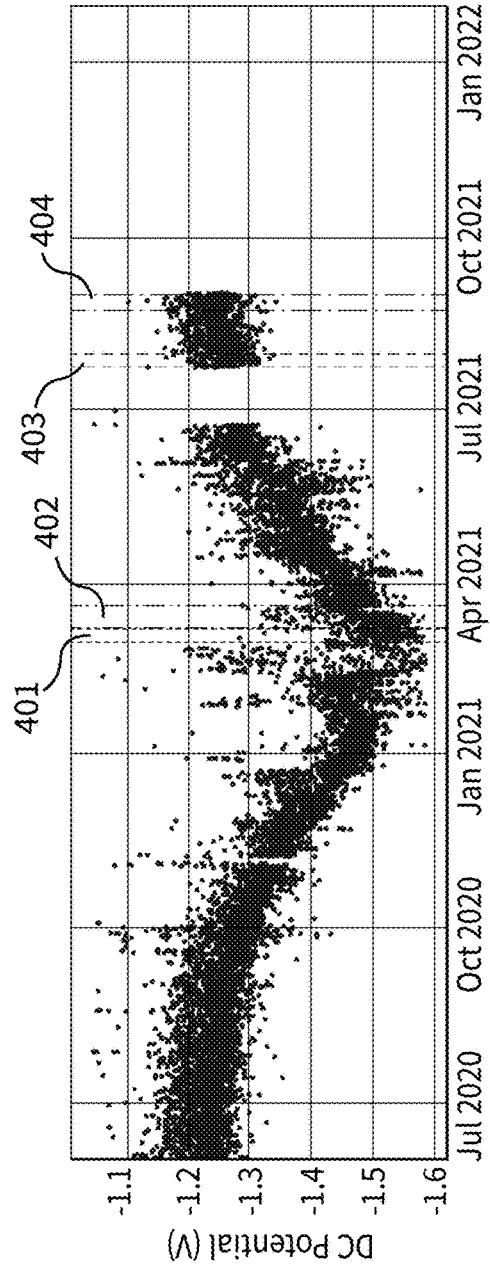
FIG. 4B is a graph showing remotely monitored coupon DC potential readings over time for a coupon in accordance with an example embodiment of the present application.

Statistics were calculated from the hourly remotely monitored DC On potential readings from the West and East coupon test stations at either end of this pipeline segment. FIGS. 4A and 4B illustrate a graph of the remotely monitored DC potential readings over time for the West and East coupon test stations, respectively. Highlighted sections 401, 402, 403, and 404 show selected time periods for which statistics were generated and used in further analysis hereinafter. Section 401 represents the time period before the CIS survey, while section 402 represents the time period during which the CIS survey was taking place. Sections 403 and 404 represent two periods of time after the conclusion of the CIS survey. Gaps in the time series DC On potential readings are due to downtime of the remote monitoring units.

For each test station, a measurement or series of measurements act as a calibration. If a system has test stations with remote monitoring units that are aware of rectifier interruption schedules, a synchronized reading can be captured at the time of the CIS. In lieu of this type of measurement, a single reading can be captured or statistical average can be calculated at a time where rectifiers are not undergoing interruption. In this embodiment, statistics were gathered from the remotely monitored DC potential readings for the week prior to the start of the CIS survey. This time period was chosen to avoid any influence from rectifier interruptions on the coupon readings. However, in some cases more than two weeks would have passed between this calculation and the related CIS measurement. For each coupon test station, an average and standard deviation of the remotely monitored DC potential measurements were calculated. This average value should represent the CIS measurement of the nearby CIS station with a calibration factor depending on the specific set up, including the type of coupon, and distance to the pipeline. In the example embodiment, the average and standard deviation values for each coupon test station's DC potential measurements were taken to be proxy measurements of the nearby CIS station in order to calibrate the CIS data with the RMU data.

Figure 5:
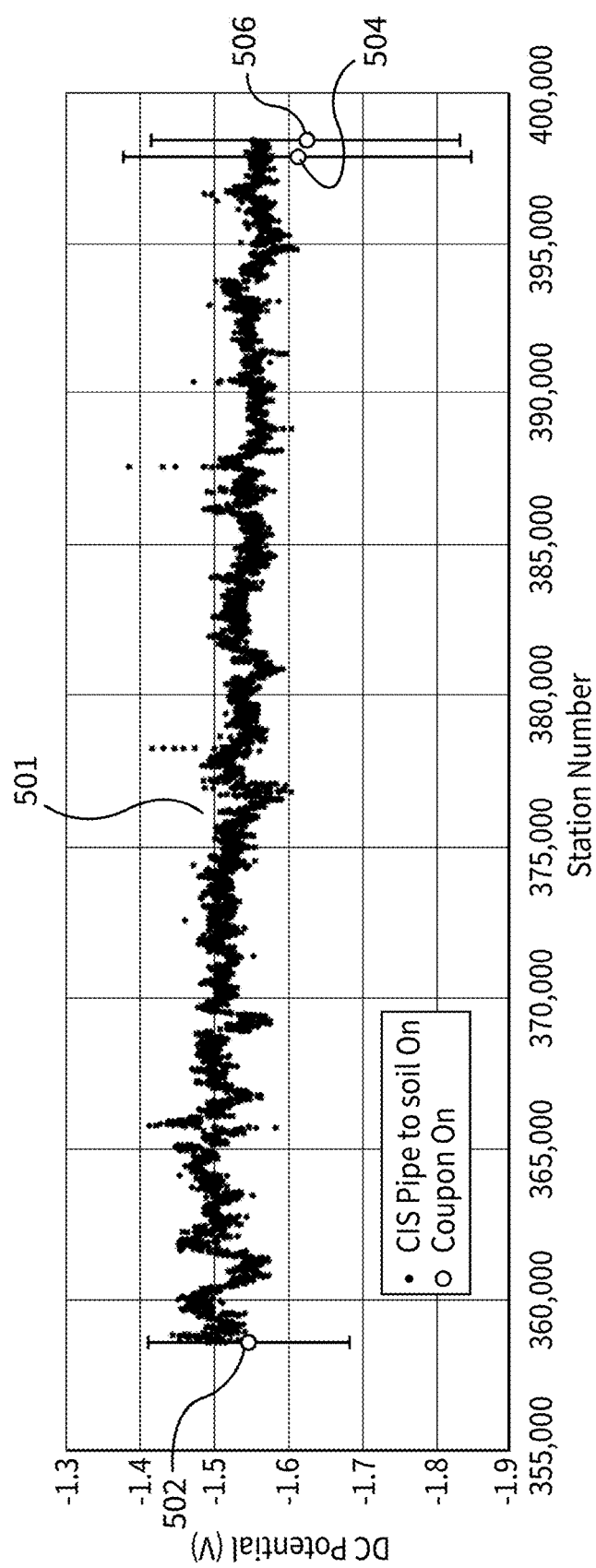
FIG. 5 is a graph showing CIS DC potential measurements and remotely monitored coupon averaged readings along a pipeline in accordance with an example embodiment of the present application.

FIG. 5 is a graph showing CIS DC potential measurements and remotely monitored coupon averaged readings along a pipeline segment in accordance with an example embodiment of the present application. For this selected segment, RMU statistics were calculated from hourly DC On potential readings for the week prior to the CIS survey from the three coupon test stations at either end of the segment. FIG. 5 illustrates a plot 501 of the DC On potentials from CIS measurements along with RMU coupon averaged readings 502, 504, and 506 from the three coupon test stations located between station numbers 350,000 and 400,000. The average of the RMU DC On potential readings for each of the three coupon stations calculated for the week before the start of the close interval survey is shown using circles as 502, 504, 506 at the respective station numbers along with error bars of one standard deviation. As illustrated in FIG. 5, there is good agreement between the general trend of the CIS measurements along the pipeline and the average of the RMU coupon readings.

Continuing with the example embodiment, the spatial profile of the CIS measurements along a pipeline segment bookended by two coupon RMUs can be projected to any time period by using the RMU readings as anchor points for the projection. One method of projecting the CIS measurements to a different time is by using the RMU measurements from that time as anchor points for extrapolating the data.

In the example embodiment, the CIS measurements taken during March 2021 were calibrated with averaged values of the remotely monitored coupon readings taken during the same time period, as discussed above. To project the CIS measurement profile to a different time period, statistics were gathered for remotely monitored coupon readings for the months of July 2021 and August 2021. The average and standard deviation of the remotely monitored coupon potential readings was then calculated for July 2021 and August 2021. The calculated average potentials at these times act as anchor points for either end of the CIS profile, which is shifted based on a linear projection between the West and East coupons.

Figure 6:
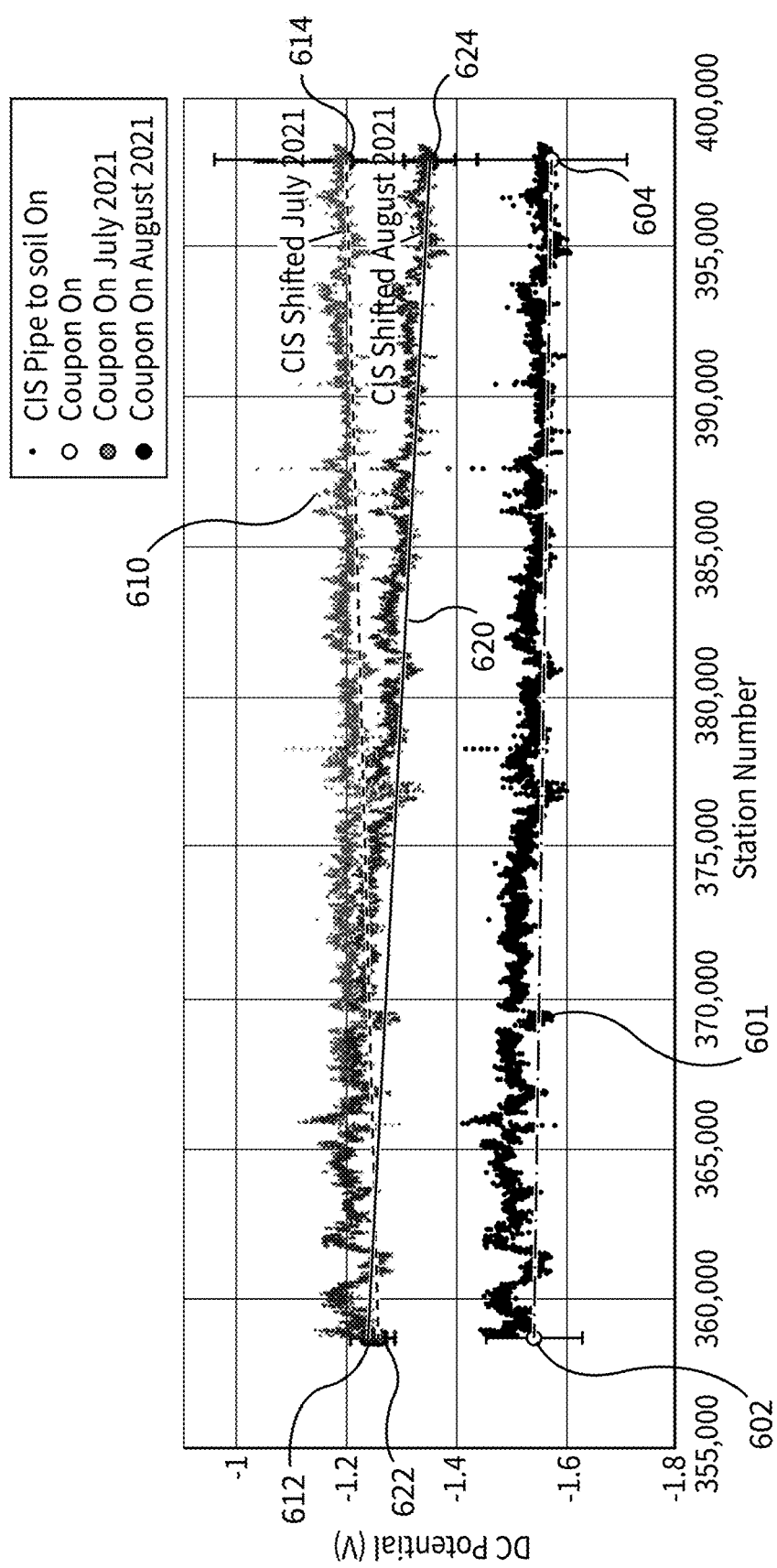
FIG. 6 is a graph of CIS DC potential measurements and projection for different time periods along with remotely monitored coupon averaged readings along the pipeline in accordance with an example embodiment of the present application.

FIG. 6 is a graph of CIS DC potential measurements and projections for different time periods along with remotely monitored coupon averaged readings along the pipeline in accordance with an example embodiment of the present application. Plot 601 is a measured CIS profile taken in March 2021 anchored by averaged values of the remotely monitored RMU readings 612 for the West coupon and 614 for the East coupon. The calculated averaged values or the coupon anchor points are shown using circles as 602 and 604 at either end of the segment, along with a linear fit between the coupon anchor points 602, 604. Plot 610 represents a projection of the CIS profile to July 2021 bookended by averaged values of the remotely monitored RMU readings 612 for the West coupon and 614 for the East coupon taken during the same time period. Plot 620 represents a projection of the CIS profile to August 2021 bookended by averaged values of the remotely monitored RMU readings 622 for the West coupon and 624 for the East coupon taken during the same time period. As can be seen from FIG. 6, the averaged value of the readings for the West coupon for July 2021 and August 2021 look very similar, whereas the averaged values for the East coupon July measurement is larger than the August measurement. This results in a projected CIS profile which matches closely near the West coupon but diverges near the East coupon.

The spatial profile of the CIS measurements can also be projected to a different time period using a seasonality model to predict how the potential CIS profile would change over time. This method is useful for making a projection of the CIS profile to a time period for which remotely monitored coupon readings are not available, for example due to a downtime of the remote monitoring units. A seasonality model can also be used to predict CIS measurement profiles for a time in the future. The coupon potential values captured hourly using a remote monitoring unit, exhibit a yearly cyclical behavior which is referred to as seasonal variation. This behavior may be attributed to seasonal changes in moisture, temperature, pH or ion changes throughout the year. The seasonal variation can be modelled using a cosine function, with A as amplitude, $\varphi$ as phase-shift, representing the calendar date of maximum potential, m as the slope change in potential over time and $V_o$ as the average potential. This is represented in Equation 1:

$$V_{DC} = A\cos(2\pi t - \varphi) + mt + V_o \quad [1]$$

Figure 7A:
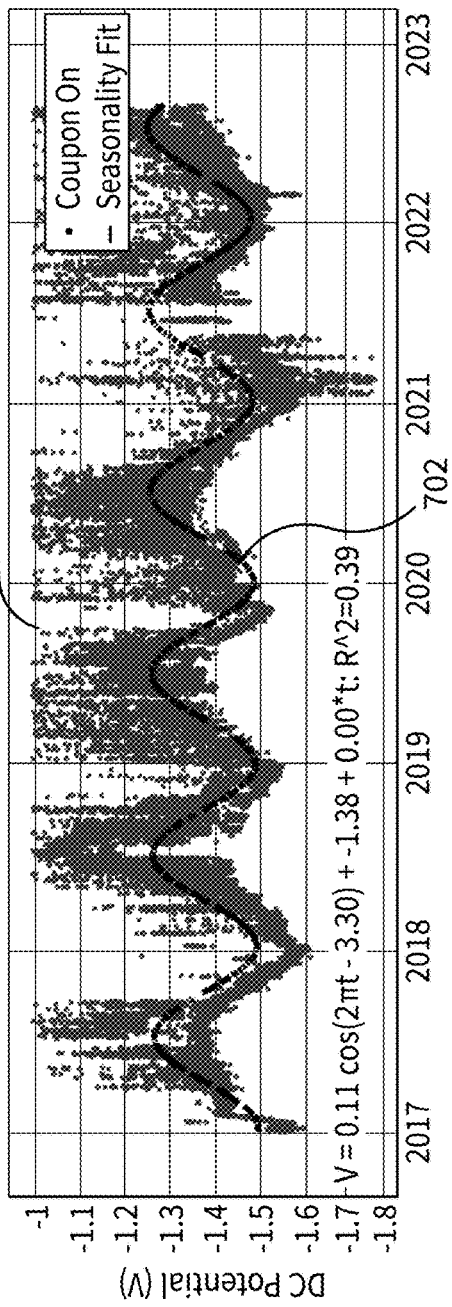
FIG. 7A is a graph illustrating seasonal variation of remotely monitored coupon DC potential readings for a coupon in accordance with an example embodiment of the present application.
Figure 7B:
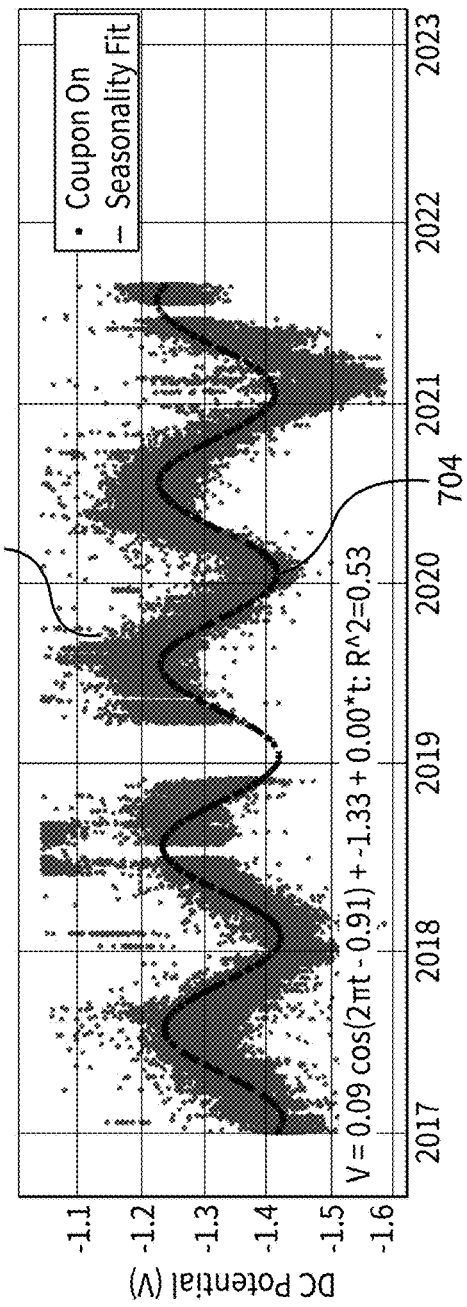
FIG. 7B is a graph illustrating seasonal variation of remotely monitored coupon DC potential readings for a coupon in accordance with an example embodiment of the present application.

FIGS. 7A and 7B illustrate the seasonal variation of the RMU DC potential for the West coupon test station and the East coupon test station, respectively. FIG. 7A presents a plot 701 of RMU DC On readings for the West coupon test station over a time-period of at least four years, starting in 2017. FIG. 7B presents a plot 703 of RMU DC On readings for the East coupon test station over a time-period of at least four years, starting in 2017. The RMU DC potential data is quite noisy, with frequently occurring increases in potential, as can be seen in the plots 701 and 703. Due to the large number of datapoints presented here, the large increases and decreases from the trend appear more prominently than the majority of the datapoints which are clustered on top of each other.

The seasonal variation for the West coupon and East coupon was modelled using Equation 1. The seasonality model best fit 702 for the West coupon test station is overlaid in FIG. 7A with a black dashed line, and is represented as shown below:

$$V_{DC} = 0.11\cos(2\pi t - 3.30) + -1.38 + 0.00 * t$$

The seasonality model best fit 704 for the East coupon is overlaid in FIG. 7B with a black dashed line, and is represented as shown below:

$$V_{DC} = 0.09\cos(2\pi t - 3.60) + -1.33 + 0.00 * t$$

Variable t represents an absolute time and may be represented, for example, as a date and/or time. The phase parameter $\varphi$ representing the calendar date of maximum potential for the West coupon and the East coupon represent dates in June (West $\varphi=3.3$ June 9th, and East $\varphi=3.6$, June 23rd). In previous studies looking at rectifier resistance, the maximum resistance peaks occur generally in February and March for units in the Northern hemisphere.

Figure 8:
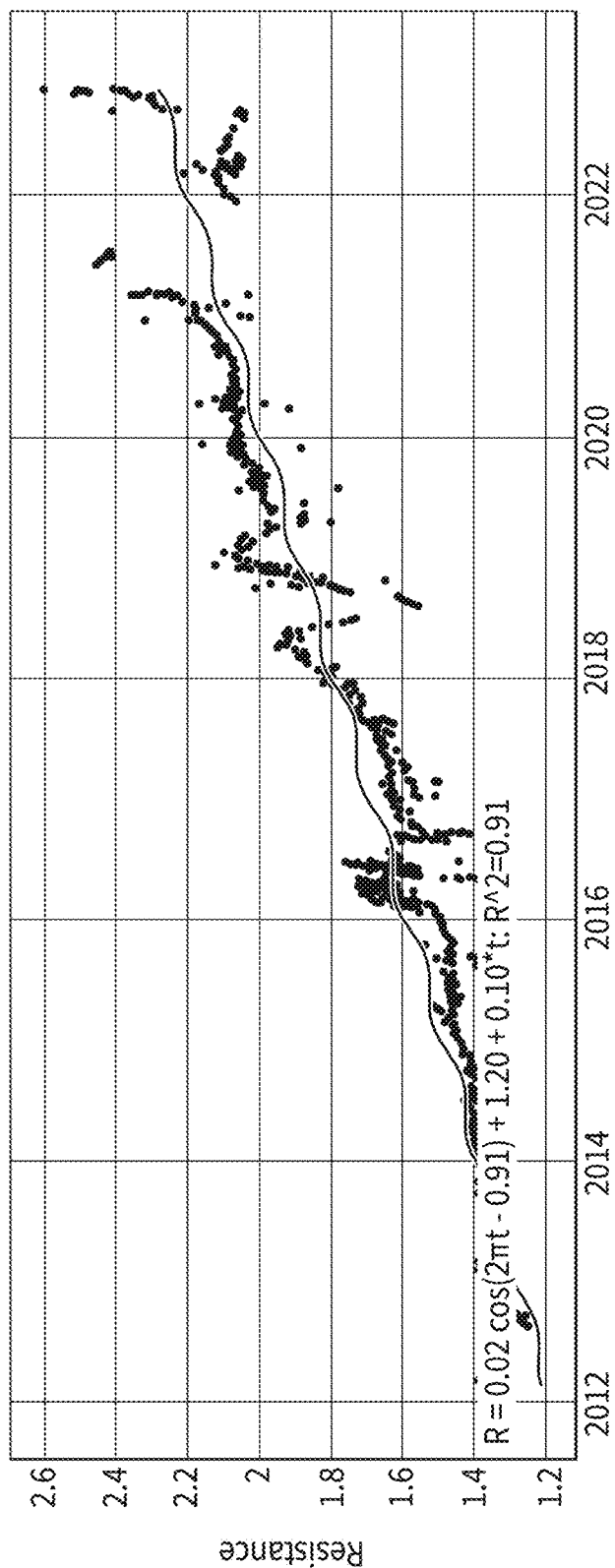
FIG. 8 is a graph of rectifier resistance over time for a CIS station along a pipeline in accordance with an example embodiment of the present application.

FIG. 8 shows the rectifier resistance over time for station number 480,000 which does not experience significant seasonal variation. This may be attributed to the environment as the extreme daily temperature variation and low moisture in the soil could be a factor in the lack of system resistance variation and the presence of coupon potential variance. The configuration and depth of the anodes in the groundbed could also be a factor.

Figure 9:
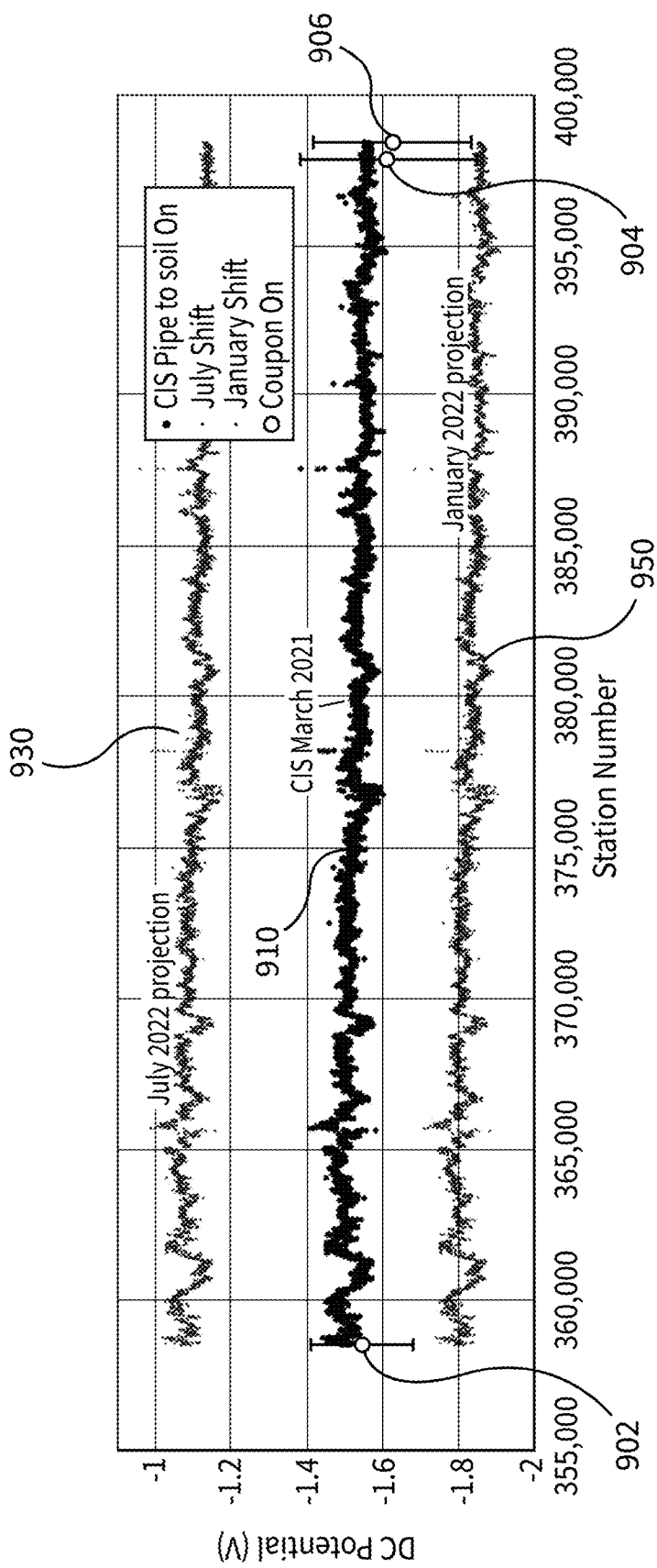
FIG. 9 is a graph showing DC potentials from CIS measurements and remotely monitored coupon averaged readings along a pipeline in accordance with an example embodiment of the present application.

Continuing with the example embodiment, the seasonal variation model represented by Equation 1 can be applied to the CIS data by using the West and East coupon potential RMU readings as proxy measurements of the way the pipeline's potentials could change over time. This is accomplished by first determining seasonally adjusted RMU readings for each coupon test stations by applying the seasonal variation model to the available RMU data. Assuming an appropriate calibration between the coupon test stations and the nearest CIS station measurement, the CIS's pattern can be projected to a different time of year by transposing the measured CIS pattern based on the seasonally adjusted RMU readings for each coupon test station. FIG. 9 shows a plot 910 of the DC potentials from CIS measurements between station numbers 350,000 and 400,000 bookended by RMU coupon averaged readings 902, 904, and 906 for each coupon test station for March 2021. Error bars of one standard deviation are also shown in FIG. 9 for each of the RMU coupon averaged readings. FIG. 9 also shows the projection of the CIS pattern to July 2021 and January 2022, as represented by plots 930 and 950, respectively. The projection assumes that the seasonal behavior observed on the coupon test stations with the remote monitoring units are representative of the seasonal behavior along the pipe between these anchor points. In this example, the test stations have comparable amplitudes, so the shift seen in projected plots 930 and 950 is vertical. If one test station were to experience significantly different seasonal behavior, then the change would be scaled according to the distance from the test station. In addition, the variance or standard deviation could be used to add confidence intervals around the projected data.

Figure 10:
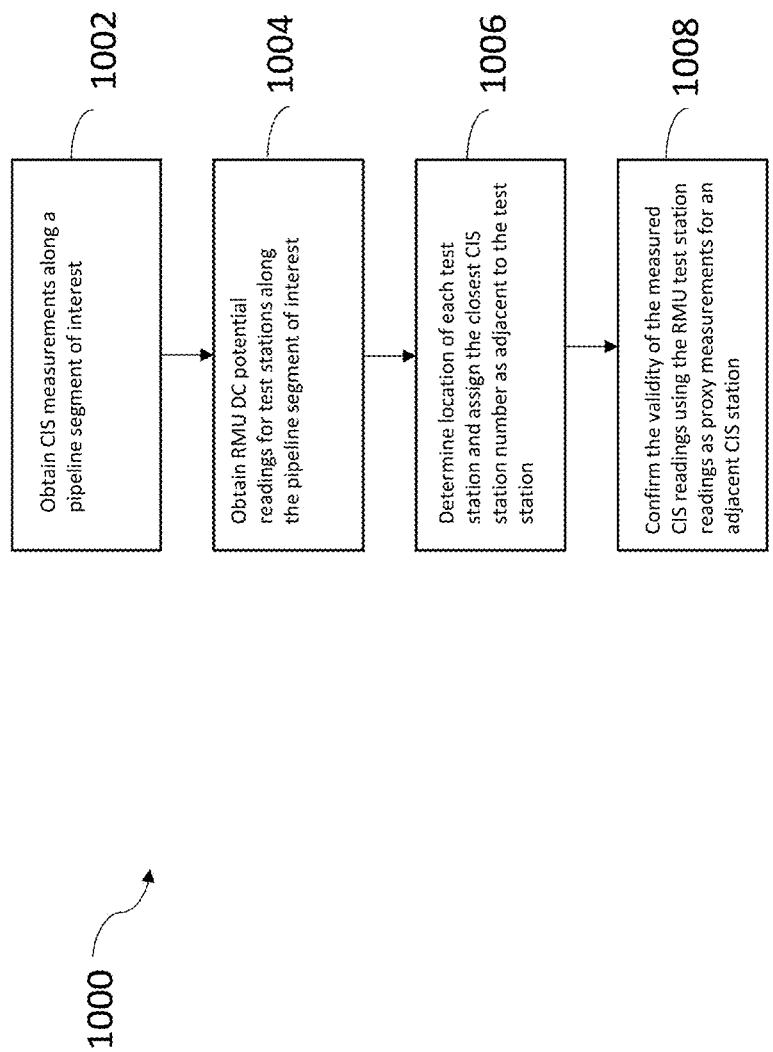
FIG. 10 is a flowchart illustrating a method for calibrating CIS data with remotely monitored data in accordance with one aspect of the present application.

FIG. 10 illustrates a method 1000 for calibrating CIS measurements with RMU readings along a pipeline segment of interest according to one aspect of the present application. In a first step, CIS measurements at various CIS stations along the pipeline segment of interest are obtained (block 1002). Next, RMU DC potential readings from test stations along the pipeline segment of interest are obtained (block 1004). In a preferred aspect, the CIS measurements are taken synchronously with the RMU DC potential readings. In another aspect, the RMU DC potential readings are gathered prior to the start of the CIS survey to avoid influence from rectifier current source interruptions. In a further aspect, the test stations include at least a first test station positioned at one end of the pipeline segment of interest and a second test station position at the other end of the pipeline segment of interest.

In a next step, the approximate location of each RMU test station along the pipeline segment is determined by calculating the distance between the latitude and longitude of each test station and each CIS station number. The closest CIS station number is then assigned as adjacent to the coupon test station (block 1006).

In one aspect, the statistical average and standard deviation of each RMU test station's DC potential readings are calculated and plotted against the nearest CIS station number. In another aspect, a single DC potential reading for each RMU test station can be plotted against the nearest CIS station number. The RMU readings can be used to confirm the validity of the measured CIS readings by using the RMU readings as a proxy measurement of the adjacent CIS station number in order to calibrate the CIS data with the RMU data (block 1008). This value should represent the CIS measurement, with a calibration factor depending on the specific setup, and distance to pipeline. As CIS data is captured infrequently, the value of a CIS diminishes with time. Calibrating the CIS with real-time data from RMUs along the pipeline can extend the useful service life of the data. This forms one potential pillar for creating a digital twin of a pipeline cathodic protection system.

Figure 11:
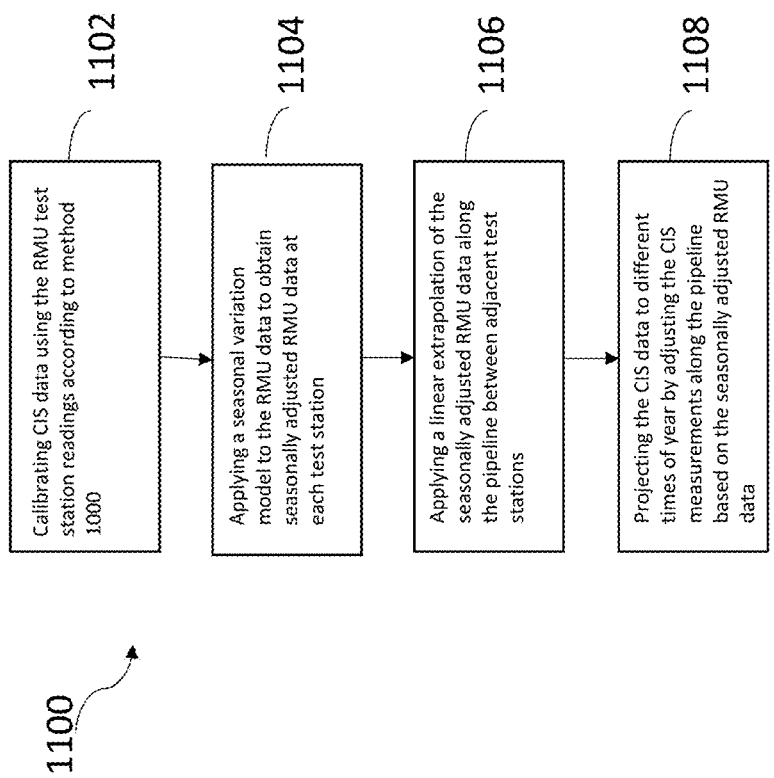
FIG. 11 is a flowchart illustrating a method for seasonally modelling CIS measurement data to different times of year in accordance with one aspect of the present application; and, FIG. 12 is a flowchart illustrating a method for seasonally modelling CIS measurement data to different times of year in accordance with one aspect of the present application.

Data analytic techniques can also be applied to the historic trends from various RMU readings to calibrate the CIS readings based on seasonal variations modelled by the RMU data. FIG. 11 illustrates a method 1100 for seasonally modelling CIS measurement data to different times of year. Method 1100 can be used to project CIS data to time periods for which RMU data is not readily available or to time periods in the future. In the first step, CIS data can be calibrated by confirming the validity of the measured CIS readings using the RMU readings according to method 1000 (block 1102). Next, a seasonal variation model can be applied to the RMU readings to obtain seasonally adjusted RMU readings at each test station (block 1104). The RMU measurements, which may be taken hourly, exhibit a yearly cyclical behavior or seasonal variation. This behavior can be the result of moisture, temperature, pH or ion changes throughout the year. The hourly RMU data can be fit to a seasonality model using a cosine function as represented by Equation 1.

An extrapolation of the seasonally adjusted RMU readings, which may be linear, non-linear or other suitable extrapolation, can be made along the pipeline between two adjacent test stations, as different test stations may experience different seasonal behavior (block 1106). The CIS data can then be projected to different times of year by shifting the CIS potential measurements up or down based on the seasonally adjusted RMU readings that represent the seasonal behavior along the pipeline (block 1108). The projection assumes that the seasonal behavior observed on the test stations with the remote monitoring units are representative of the seasonal behavior along the pipeline between the test stations. The CIS projections may be analyzed for identifying any high-risk locations on the pipeline, for example where the potential measurement is no longer meeting the regulatory requirements. Overlaying additional contextual information such as proximity to AC powerlines, river crossings and other environmentally sensitive areas, and other sources of interference can lead to further inference of high-risk locations on the pipeline.

FIG. 12 illustrates an alternate method 1200 for seasonally modelling CIS measurement data to different times of year. Method 1200 can be used when RMU data is available for the time period over which the CIS data is being projected. In the first step, CIS data for a first time period can be calibrated by confirming the validity of the measured CIS readings using the RMU readings according to method 1000 (block 1202). Next, a second set of remotely monitored potential readings measured at the plurality of test stations are obtained for a second time period (block 1204). A linear extrapolation of the second set of remotely monitored potential readings is applied along the pipeline between two adjacent test stations (block 1206). The CIS data can then be projected to the second time period by adjusting the CIS potential measurements from the first time period based on the linear extrapolation of the second set of remotely monitored potential readings (block 1208).

Using the seasonal RMU data to calibrate a CIS dataset extends the utility of the CIS dataset beyond the specific point in time at which it was collected. The combination of CIS measurements and RMU measurements allows for a better understanding of the spatial and temporal variation in protection currents. The projected seasonal CIS data can be used to optimize system operation by reducing or increasing protection currents at different times of the year. This allows the pipeline to remain in compliance throughout the year even if the seasonal variation is substantial. This also results in less exposure to the impacts of AC corrosion in areas of high AC interference. Additionally, knowing the profile of the CIS at different points along the pipe, as well as the time-dependency of the remote monitoring units can help in creating an automated CP system in which test station monitor data can be used to create a feedback loop, ramping the CP current source up or down depending on the readings and their context in the CIS profile.

The calibration of CIS dataset with seasonal RMU data can also inform the selection of critical testing locations for further remote monitoring systems. The granularity of the CIS and real-time calibration with RMU operational data, allows an operator to identify specific locations where remote monitoring can provide a maximal inference into protection system performance and protection criteria across a broader section of pipeline. This allows a pipeline operator to strategically place remote monitoring assets where additional granularity will improve accuracy of the system, and for pipeline sections with known operating risks such as abnormalities or higher risk locations.

Data analytics can also be applied to annual survey data as an additional validation technique to compare with both CIS and RMU data. An annual potential survey is based on recording pipe-to-soil potentials at intervals over the pipeline at above ground test stations using a calibrated portable reference electrode while interrupting the current source. The potential measurements recorded are indicative of the level of cathodic protection at the test station location. As the difference in soil resistance between the location on the surface where a portable reference electrode is positioned is relatively stable with regard to the location at the pipe where a permanent reference electrode is buried, any drift in these measurements over time could indicate drift in reference stability. Therefore, the annual survey data can provide a proxy indication of a buried reference cell performance over time.

While the invention has been described in terms of specific embodiments, it is apparent that other forms could be adopted by one skilled in the art. For example, the methods described herein could be performed in a manner which differs from the embodiments described herein. The steps of each method could be performed using similar steps or steps producing the same result, but which are not necessarily equivalent to the steps described herein. Some steps may also be performed in different order to obtain the same result. Similarly, the apparatuses and systems described herein could differ in appearance and construction from the embodiments described herein, the functions of each component of the apparatus could be performed by components of different construction but capable of a similar though not necessarily equivalent function, and appropriate materials could be substituted for those noted. Accordingly, it should be understood that the invention is not limited to the specific embodiments described herein. It should also be understood that the phraseology and terminology employed above are for the purpose of disclosing the illustrated embodiments, and do not necessarily serve as limitations to the scope of the invention.

What is claimed is:

1. A method for calibrating close interval survey (CIS) measurements, the method comprising:
   obtaining a plurality of CIS measurements from a plurality of CIS locations along a pipeline;
   obtaining a first plurality of remotely monitored measurements from a plurality of test stations positioned along the pipeline for a first time period;
   assigning, for each of the plurality of test stations, one of the plurality of CIS locations as an adjacent CIS location based on location data for the plurality of CIS locations and the plurality of test stations;
   calibrating the CIS measurements with the remotely monitored measurements by using the first plurality of remotely monitored measurements for each of the plurality of test stations as a proxy measurement for the adjacent CIS location;
   applying a seasonal variation model to the first plurality of remotely monitored measurements to obtain seasonally adjusted remotely monitored measurements for each test station of the plurality of test stations for a second time period;
   extrapolating the seasonally adjusted remotely monitored measurements along the pipeline between two adjacent test stations of the plurality of test stations to obtain seasonally adjusted remotely monitored measurements between the two adjacent test stations; and,
   projecting the plurality of CIS measurements to the second time period by adjusting the plurality of CIS measurements based on the extrapolation of the seasonally adjusted remotely monitored measurements along the pipeline to obtain projected CIS potential measurements for the second time period.

2. The method of claim 1, further comprising:
   calculating, for each of the plurality of test stations, an average value of the first plurality of remotely monitored measurements; and,
   calibrating the CIS measurements with the remotely monitored measurements by using the average value of the first plurality of remotely monitored measurements for each of the plurality of test stations as the proxy measurement for the adjacent CIS location.

3. The method of claim 1, wherein the remotely monitored measurements comprises time-series voltage data or time-series current data.

4. The method of claim 1, wherein the first plurality of remotely monitored measurements comprise historic daily DC potential measurements from each of the plurality of test stations.

5. The method of claim 1, wherein the plurality of CIS measurements are obtained during the first time period.

6. The method of claim 1, wherein the plurality of test stations comprise a first test station positioned at a first end of the pipeline and a second test station positioned at a second end of the pipeline.

7. The method of claim 1, wherein the plurality of CIS measurements comprises pipe-to-soil AC and DC potentials at each of the plurality of CIS locations.

8. The method of claim 1, wherein the plurality of CIS measurements and the first plurality of remotely monitored measurements are recorded with latitude and longitude data and GPS timestamps.

9. The method of claim 1, wherein assigning, for each of the plurality of test stations, one of the plurality of CIS locations as the adjacent CIS location based on location data for the plurality of CIS locations and the plurality of test stations comprises:
   calculating a distance between latitude and longitude of each of the plurality of test stations and each of the plurality of CIS locations.

10. The method of claim 1, wherein applying the seasonal variation model comprises using a cosine function represented by:

$$V_{DC}=A\cos(2\pi t-\varphi)+mt+V_o$$

wherein $V_{DC}$ is the DC potential, A is amplitude, t is absolute time, $\varphi$ is phase-shift, representing the calendar date of maximum potential, m is the slope change in potential over time, and $V_o$ is the average potential.

11. The method of claim 1, further comprising:
   obtaining remotely monitored rectifier voltage and current measurements from a plurality of rectifiers installed along the pipeline; and,
   analyzing influence of the rectifier voltage and current measurements on the CIS measurements.

12. A method for calibrating close interval survey (CIS) measurements, the method comprising:
   obtaining a plurality of CIS measurements from a plurality of CIS locations along a pipeline;
   obtaining a first plurality of remotely monitored measurements from a plurality of test stations positioned along the pipeline for a first time period;

assigning, for each of the plurality of test stations, one of the plurality of CIS locations as an adjacent CIS location based on location data for the plurality of CIS locations and the plurality of test stations;

calibrating the CIS measurements with the remotely monitored measurements by using the first plurality of remotely monitored measurements for each of the plurality of test stations as a proxy measurement for the adjacent CIS location;

obtaining a second plurality of remotely monitored measurements from the plurality of test stations for the second time period;

extrapolating the second plurality of remotely monitored measurements along the pipeline between two adjacent test stations of the plurality of test stations; and, projecting the plurality of CIS measurements to the second time period by adjusting the plurality of CIS measurements based on the extrapolation of the second plurality of remotely monitored measurements along the pipeline to obtain projected CIS potential measurements for the second time period.

13. A computer-implemented method for seasonally modelling close interval survey (CIS) potential measurements for a pipeline segment, the method comprising:

validating CIS potential measurements taken along the pipeline segment during a first time period with remotely monitored potential measurements measured at a plurality of test stations along the pipeline segment during the first time period based on location data of the CIS potential measurements and the remotely monitored potential measurements;

applying a seasonal variation model to the remotely monitored potential measurements to obtain seasonally adjusted potential measurements for the plurality of test stations for a second time period;

applying an extrapolation of the seasonally adjusted potential measurements along the pipeline between two adjacent test stations of the plurality of test stations; and, projecting the CIS potential measurements to the second time period by adjusting the CIS potential measurements based on the extrapolation of the seasonally adjusted potential measurements along the pipeline to obtain projected CIS potential measurements for the second time period.

14. The computer-implemented method of claim 13, wherein the seasonal variation model comprises using a cosine function represented by:

$$V_{DC}=A\cos(2\pi t-\varphi)+mt+V_o$$

wherein $V_{DC}$ is the DC potential, A is amplitude, $\varphi$ is phase-shift, representing the calendar date of maximum potential, m is the slope change in potential over time, and $V_o$ is the average potential.

15. The computer-implemented method of claim 13, wherein validating the CIS potential measurements with the remotely monitored potential measurements comprises:

assigning, for each of the plurality of test stations, a location of one of the CIS potential measurements as an adjacent CIS location based on the location data for the CIS potential measurements and the plurality of test stations; and, calibrating the CIS potential measurements with the remotely monitored potential measurements by using the remotely monitored potential measurements for each of the plurality of test stations as a proxy measurement for the adjacent CIS location.

16. A computer-implemented method for seasonally modelling close interval survey (CIS) potential measurements, the method comprising:

validating CIS potential measurements taken along a pipeline segment during a first time period with a first plurality of remotely monitored potential measurements measured at a plurality of test stations along the pipeline segment during the first time period;

obtaining a second plurality of remotely monitored potential measurements measured at the plurality of test stations during a second time period;

extrapolating the second plurality of remotely monitored potential measurements between two adjacent test stations of the plurality of test stations for the second time period; and, projecting the CIS potential measurements to the second time period by adjusting the CIS potential measurements from the first time period based on the extrapolation of the second plurality of remotely monitored potential measurements to obtain projected CIS potential measurements for the second time period.

17. The computer-implemented method of claim 16, wherein validating CIS potential measurements with a first plurality of remotely monitored potential measurements comprises calibrating the CIS potential measurements with an average of the first plurality of remotely monitored potential measurements at each of the plurality of test stations based on location data of the CIS potential measurements and the plurality of test stations.

18. A non-transitory computer readable medium containing computer instructions stored therein for causing a computer processor to perform the steps of:

receiving close interval survey data from a close interval survey (CIS) performed at a plurality of CIS locations along a pipeline for a first time period;

receiving remotely monitored data from a plurality of test stations positioned along the pipeline for the first time period;

assigning, for each of the plurality of test stations, one of the plurality of CIS locations as an adjacent CIS location based on location data for the plurality of CIS locations and the plurality of test stations;

calibrating the close interval survey data with the remotely monitored data by using the remotely monitored data for each test station of the plurality of test stations as a proxy measurement for the adjacent CIS location;

applying a seasonal variation model to the remotely monitored data to obtain seasonally adjusted remotely monitored data for each test station of the plurality of test stations for a second time period;

extrapolating the seasonally adjusted remotely monitored data along the pipeline between two adjacent test stations of the plurality of test stations to obtain seasonally adjusted remotely monitored data between the two adjacent test stations; and projecting the close interval survey data to the second time period by adjusting the close interval survey data based on the extrapolation of the seasonally adjusted remotely monitored data along the pipeline to obtain projected CIS potential measurements for the second time period.

19. The method of claim 18, wherein applying the seasonal variation model comprises using a cosine function represented by:

$$V_{DC}=A\cos(2\pi t-\varphi)+mt+V_o$$

wherein $V_{DC}$ is the DC potential, A is amplitude, t is absolute time, φ is phase-shift, representing the calendar date of maximum potential, m is the slope change in potential over time, and $V_o$ is the average potential.

* * * * *